REFUSE COLLECTING AND DISPENSING VEHICLE

Original Filed Aug. 9, 1968 2 Sheets-Sheet 1

INVENTOR
JOHN W. KNIGHT
BY
Zarley, McKee & Thomte
ATTORNEYS

REFUSE COLLECTING AND DISPENSING VEHICLE

Original Filed Aug. 9, 1968 2 Sheets-Sheet 2

INVENTOR
JOHN W. KNIGHT
BY
Zarley, McKee & Thomte
ATTORNEYS

United States Patent Office

Re. 27,997
Reissued Apr. 30, 1974

27,997
REFUSE COLLECTING AND DISPENSING VEHICLE

John W. Knight, New Hampton, Iowa, assignor to Sani-Systems, Inc., New Hampton, Iowa Original No. 3,542,225, dated Nov. 24, 1970, Ser. No. 751,562, Aug. 9, 1968. Application for reissue Nov. 13, 1972, Ser. No. 305,791
Int. Cl. B60p *1/16*
U.S. Cl. 214—508 14 Claims

Matter enclosed in heavy brackets [ ] appears in the original patent but forms no part of this reissue specification; matter printed in italics indicates the additions made by reissue.

ABSTRACT OF THE DISCLOSURE

A refuse collecting and dispensing vehicle including a powered wheeled frame means having a refuse collection box pivotally mounted thereon. A hydraulic cylinder means is connected to the box to pivot the same from a normal collection position to a dispensing position. A packing cover is pivotally mounted on the upper forward end of the box and is operated by a hydraulic cylinder means connected thereto adapted to move the packing cover from an open position with respect to the box to a position in the box. A normally closed second cover means is also pivotally mounted on the upper end of the box forwardly of the packing cover which is opened when the box is pivoted to its dispensing position to permit the refuse in the box to be dumped therefrom.

A principal object of this invention is to provide a refuse collecting and dispensing vehicle which includes means to tumble the refuse placed in the box to efficiently pack the same.

A further object of this invention is to provide a refuse collecting and dispensing vehicle including a packing cover adapted to pack the refuse in the box portion of the vehicle.

A further object of this invention is to provide a refuse collecting and dispensing vehicle including a normally closed cover means thereon which prevents the refuse from being blown from the box when the vehicle is traveling and which automatically opens when the collection box is pivoted to a dispensing position.

A further object of this invention is to provide a refuse collecting and dispensing vehicle which is compact and easily maneuverable.

A further object of this invention is to provide a refuse collecting and dispensing vehicle which permits the efficient collecting and dispensing of refuse.

A further object of this invention is to provide a refuse collecting and dispensing vehicle which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
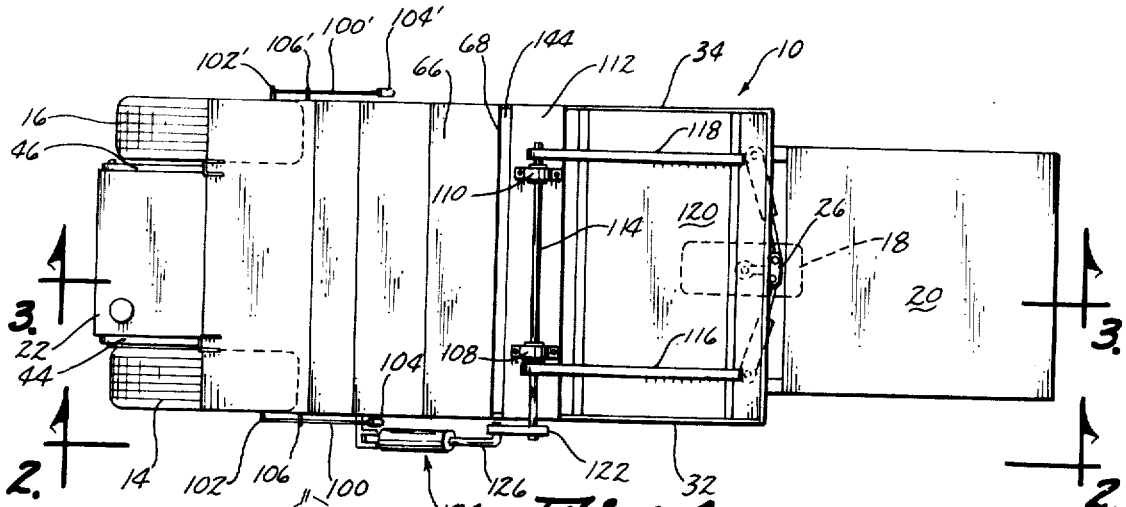
FIG. 1 is a top view of the vehicle of this invention.

The vehicle of this invention is generally designated by the reference numeral 10 and includes a frame means 12 having a pair of powered wheels 14 and 16 rotatably mounted at the forward end thereof and steering wheel 18 rotatably and pivotally secured thereto rearwardly of the forward end thereof. A cab 20 is provided on the rear end of the frame means 12 and would accommodate the vehicle operator and the controls for operating the vehicle. The vehicle 10 is powered by any suitable engine means which would be housed in the compartment 22 positioned between the wheels 14 and 16. The power means would include a suitable transmission, differential, etc. and does not form a part of this invention. The steering wheel 18 is rotated about a vertical axis by a linkage 26 which would be controlled by the operator from the cab 20.

The numeral 28 generally designates a refuse collection box which is pivotally mounted on the frame means 12 and which includes an upper end 30, opposite side walls 32 and 34, arcuate rear end wall 36, inclined rear wall 40 and bottom 42. A pair of spaced apart arms 44 and 46 are secured to the front end of wall 40 and are pivotally connected to the frame means 12 at their forward ends to provide the pivotal connection between the box 28 and the frame means 12. An arm 50 is pivotally connected to the forward side of the wall 40 at 52 and has an arm 54 pivotally connected thereto at 56. The other end of arm 54 is pivotally connected to the frame means 12 at 58 as best illustrated in FIG. 4. A hydraulic cylinder means 60 is pivotally connected at its base end to the arm 54 at 58 and is pivotally connected at its rod end to arm 50 at 62. Hydraulic cylinder 60 is connected to a suitable source of fluid under pressure and is designed to pivot the box 28 from the position illustrated by solid lines in FIG. 2 to the position illustrated by broken lines in FIG. 2. Thus, the extension of the rod 64 from the cylinder 60 causes the arms 50 and 54 to pivot with respect to each other from the position illustrated in FIG. 3 to the position illustrated in FIG. 4 to cause the box 28 to pivot from the collection position illustrated by solid lines in FIG. 2 to the dumping position illustrated by broken lines in FIG. 2. Conversely, the box 28 will be lowered from its dumping position to its collection position when the cylinder 60 is operated to cause the rod 64 to be withdrawn therein.

Figure 3:
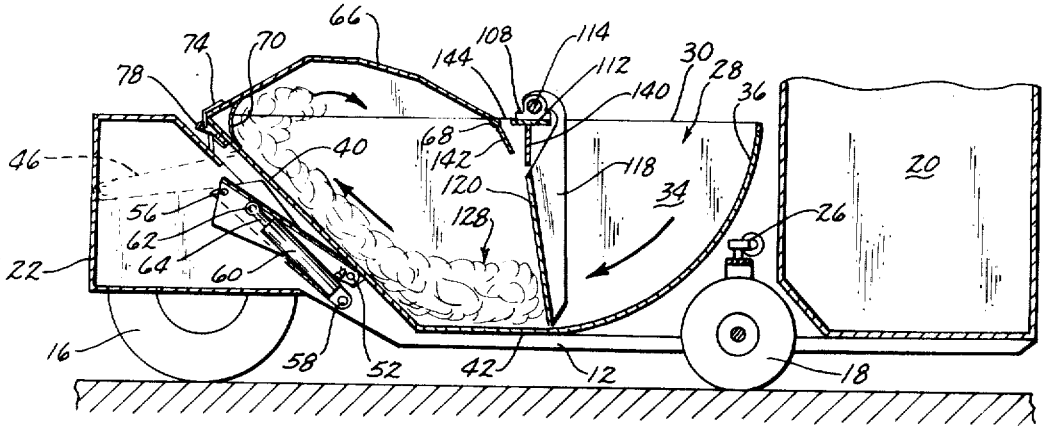
FIG. 3 is a sectional view as seen along lines 3—3 of FIG. 1 illustrating the packing cover tumbling the refuse in the collection box.
Figure 4:
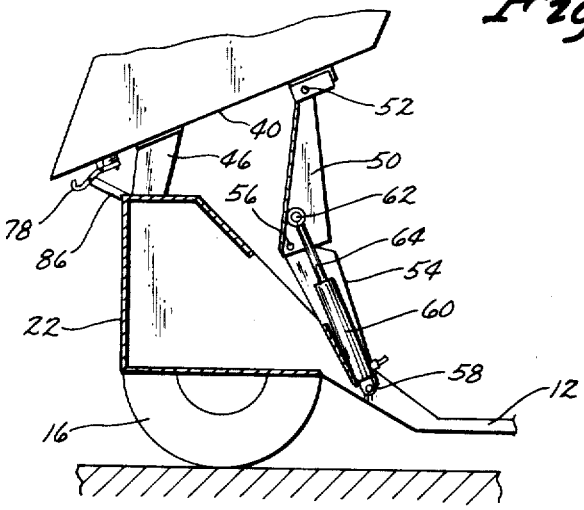
FIG. 4 is a side elevational view of the means for pivoting the refuse box with portions thereof cut away to more fully illustrate the invention.
Figure 5:
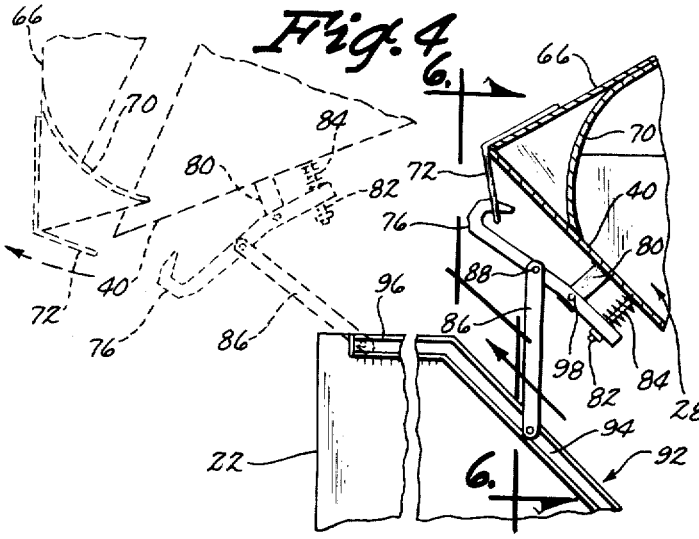
FIG. 5 is a partial side elevational view of the means for maintaining the cover in a closed position, the broken lines indicating the alternate position of the locking means and cover.
Figure 6:
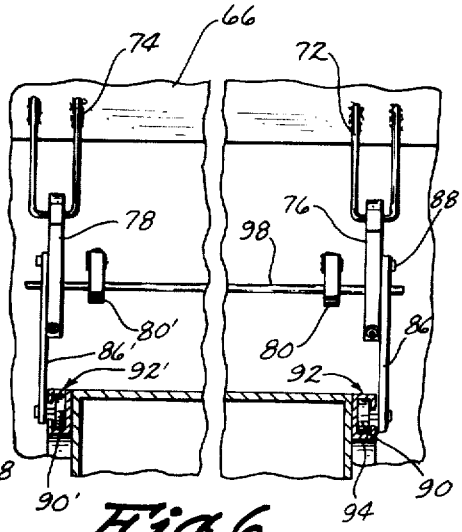
FIG. 6 is a fragmentary sectional view as seen along lines 6—6 of FIG. 5.

An arcuate cover 66 is pivotally connected at its rearward end 68 to box 28 by any suitable means and extends over the forward portion of the box 28 to normally close the same as illustrated in FIG. 3. A curved baffle 70 is secured to the forward end of cover 66 at the inside surface thereof and extends between the sides 32 and 34 of the box 28. A pair of spaced apart brackets 72 and 74 are secured to the forward end of the cover 66 and extend downwardly therefrom as illustrated in FIG. 6. A pair of spaced apart hooks 76 and 78 are pivotally mounted at the forward side of wall 40 and are adapted to engage the brackets 72 and 74 respectively to maintain the cover 66 in a closed condition on the box 28. Inasmuch as the hooks 76 and 78 and the structure associated therewith is identical, only hook 76 and its associated structure will be described. Hook 76 is pivotally connected to a post 80 which extends forwardly from the forward surface of wall 40 as illustrated in FIG. 5. A bolt means 82 is also secured to the forward surface of wall 40 and extends forwardly therefrom and is received by the lower end of the hook 76. A spring means 84 is mounted on the bolt 82 between the hook 76 and the wall 40 yieldably urges the lower end of the hook 76 forwardly to yieldably maintain the upper end of the hook 76 in engagement with the bracket 72 to maintain the cover 66 in a closed condition. A trip arm 86 is pivotally connected to hook 76 at 88 and has a roller means operatively secured to its lower end which is mounted in a guide track 92 on the frame means 12 having an inclined portion 94 extending upwardly and forwardly and a substantially horizontal portion 96 extending forwardly frame the upper end of the inclined portion 94. As seen in FIG. 6, a rod 98 extends between the posts 80 and 80' and it is upon the rod 98 that the hooks 76 and 78 are pivotally mounted. FIG. 6 also illustrates the fact that the hook 78 is operatively connected to a trip arm 86' having a roller 90' movable mounted in a guide track 92'. An arcuate rod 100 is pivotally connected at its upper end to the front end of the cover 66 at 102 and has a counterweight 104 secured to its othe rend. The rod 100 slidably extends through an eyelet 106 secured to the side 32 of the box 28.

Figure 2:
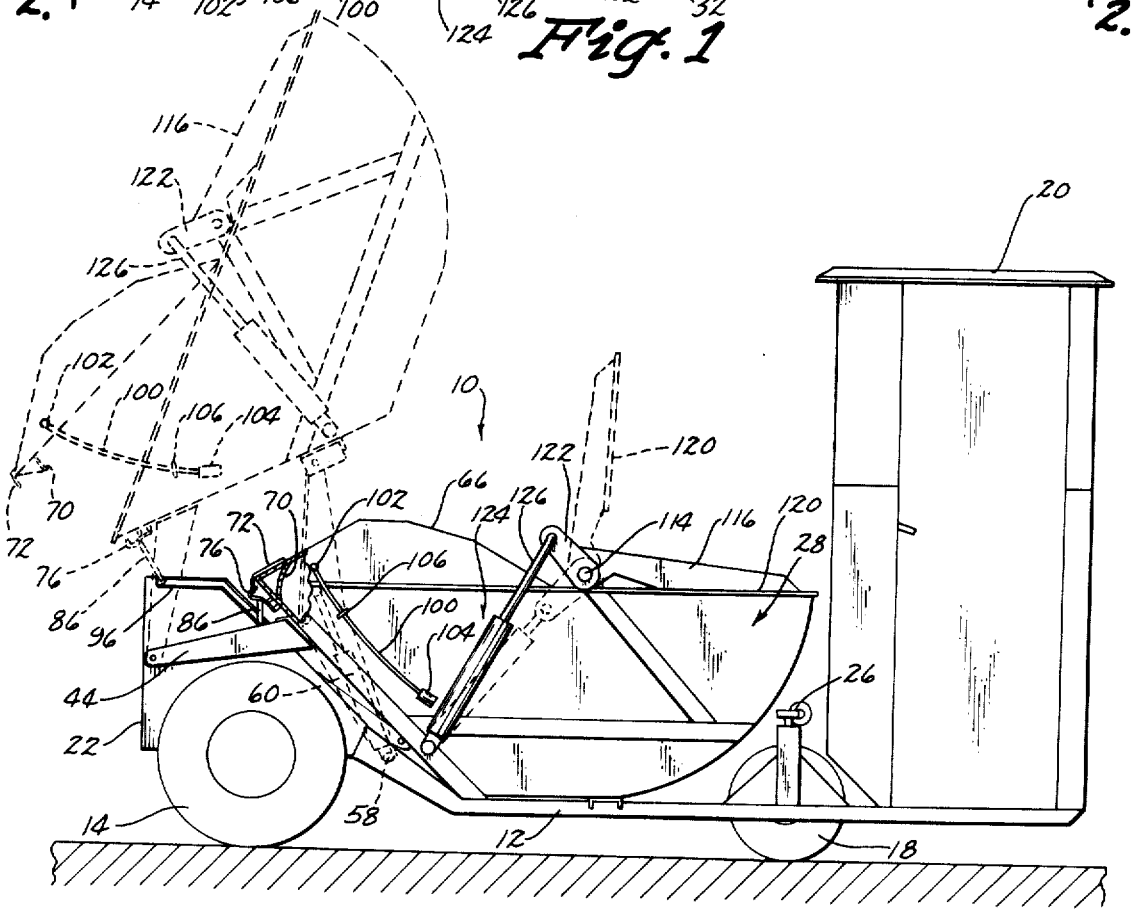
FIG. 2 is a side elevational view of the vehicle as seen along lines 2—2 of FIG. 1, the broken lines indicating the alternate positions of the packing cover and refuse box.

A pair of spaced apart bearing blocks 108 and 110 are secured to a plate 112 extending between sides 32 and 34 of box 28 and have a shaft 114 rotatably extending therethrough. Shaft 114 has a pair of arms 116 and 118 rigidly secured thereto and extending rearwardly therefrom as illustrated in FIG. 1. A packer cover 120 is secured to the arms 116 and 118 and has a width slightly less than the width of the box 28 to facilitate the movement of the cover 120 into the interior of the box 28 as illustrated in FIG. 3. A link arm 122 is rigidly secured to one end of the shaft 114 and has a hydraulic cylinder means 124 pivotally connected thereto as illustrated in FIG. 2. The lower end of the cylinder means 124 is pivotally connected to the frame means 12 and is operatively connected to the hydraulic system of the vehicle. Thus, the retraction of the rod 126 into the cylinder 124 causes the cover 120 to be pivoted in a counterclockwise direction as viewed in FIG. 2 to the position illustrated by broken lines in FIG. 2. The extension of the rod 126 of the cylinder 124 causes the cover 120 to be rotated in a clockwise direction as viewed in FIG. 2 to cause the cover 120 to move downwardly and forwardly into the interior of the box 28 as illustrated in FIG. 3.

In operation, the vehicle 10 would be driven by the operator to the collection area and the hydraulic system of the vehicle would be operated to cause the cover 120 to be pivoted to the position illustrated by broken lines in FIG. 2 so that the refuse could be dumped into the upper rear end of the box 28. When a predetermined amount of refuse has been placed in the box 28, the hydraulic cylinder 124 is operated to cause the packer cover 120 to move downwardly and forwardly into the interior of the box 28 to force the refuse, generally designated by the reference numeral 28, forwardly and upwardly in the manner illustrated in FIG. 3 to cause the refuse to be tumbled. The tumbling effect is caused by the baffle plate 70 and the arcuate shape of the cover 66. It has been found that it is necessary to tumble the refuse in order to efficiently pack the refuse in the box 28. The cover 120 would be successively operated to facilitate the depositing of refuse in the box 28 and to tumble and pack the same. The hooks 76 and 78 normally maintain the cover 66 in a closed condition to permit the tumbling of the refuse in the interior of the box 28 and to also prevent the refuse from blowing from the box. As seen in FIG. 3, a deflector plate 140 extends downwardly from plate 112 while a deflector plate 142 extends downwardly and forwardly from the rear end 68 of cover 66. Deflector plates 140 and 142 prevent refuse and moisture from going up through the opening 144 between cover 120 and plate 112.

When the box 28 is filled with refuse, the vehicle 10 will be driven to the area for dispensing the refuse and driven into the proper position. The hydraulic system of the vehicle would then be operated to cause the hydraulic cylinder 60 to be operated to cause the extension of the rod 64 to pivot the entire box 28 upwardly and rearwardly with respect to the frame means 12 from the position illustrated by solid lines in FIG. 2 to the position illustrated by broken lines in FIG. 2. The pivotal movement of the box 28 causes the rollers 90 and 90' to move upwardly and forwardly in the guide tracks 92 and 92'. When the rollers 90 and 92' reach the forward ends of the horizontal portions of the guide tracks, the continued pivotal movement of the box 28 causes the trip arm 86 and 86' to move the hooks 76 and 78 out of engagement with the brackets 72 and 74 respectively to unlock the cover 66 (FIG. 5). When the hooks 76 and 78 have become disengaged with brackets 72 and 74, the cover 66 will be free to open and is urged to an open position by the counterweights 104 and 104' on the rods 100 and 100' respectively. The cover 120 can also be operated to move inwardly into the box 28 to force the refuse in the box 28 when the box is in the position illustrated by broken lines in FIG. 2. When the refuse has been dispensed from the box 28, the hydraulic cylinder 60 would be operated to pivot the box from the position illustrated by broken lines in FIG. 2 to the position illustrated by solid lines in FIG. 2. The lowering of the box to the position illustrated by broken lines in FIG. 2 causes the hooks 76 and 78 to again engage the brackets 72 and 74 to again lock the cover 66 with respect to the box 28. The vehicle is then ready for further use. It can be appreciated that an extremely convenient and efficient refuse collecting and dispensing vehicle is disclosed herein which efficiently packs the refuse and also provides an efficient means for dispensing the refuse therefrom. The vehicle of this invention is economical of manufacture and is substantially troublefree in operation. Thus it can be seen that the device accomplishes at least all of its stated objectives.

Some changes may be made in the construction and arrangement of my refuse collecting and dispensing vehicle without departing from the real spirit and purpose of my invention, and it is my intention to cover by my claims, any modified forms of structure or use of mechanical equivalents which may be reasonably included within their scope.

I claim:

1. A refuse collecting and dispensing vehicle, comprising:

a powered wheeled frame means having rearward and forward ends;

an operator's cab on said frame means at the rearward end thereof;

a refuse collection box having opposite ends and pivotally connected at one end to said frame means at the forward end thereof, the other of said ends of said box being positioned adjacent said cab, said box having an open upper end;

a first power means connected to said box and adapted to pivotally move said box from a collection to a dispensing position;

said box having a first cover means pivotally mounted on its upper end adapted to pivotally move from an open position into said box about a horizontal axis to pack refuse in said box, said first cover being positioned adjacent said other end of said box;

a second power means connected to said first cover means adapted to pivotally move said first cover means;

a normally closed second cover means pivotally mounted on the upper end of said box forwardly of said first cover means adapted to be open when said box is pivoted to its dispensing position to permit the refuse in said box to be dumped therefrom through the open upper end thereof; and said first and second cover means adapted to selectively close the open upper end of said box.

2. The vehicle of claim 1 wherein said powered wheeled frame means includes a pair of drive wheels at the forward end thereof and a steering wheel means adjacent the rearward end thereof, said vehicle including a power means for driving said drive wheels, said power means being positioned between said drive wheels.

3. The vehicle of claim 1 wherein said second power means comprises first and second hydraulically operated cylinders positioned outwardly of the opposite sides of said box respectively.

4. The vehicle of claim 1 wherein said box has opposite side walls, a rear wall extending downwardly and forwardly, a bottom forwardly of said rear wall, and an inclined front wall extending upwardly and forwardly from the forward end of said bottom, said box adapted to receive refuse through the open upper end thereof adjacent its rearward end when said first cover means is in its open position, said first cover means adapted to move the refuse placed in said box forwardly and upwardly therein, said second cover means extending upwardly and forwardly from the upper end of said rear wall to permit the refuse to be tumbled in said box by said first cover means.

5. The vehicle of claim 1 wherein said box is pivotally connected at its upper forward end to said frame means, at the forward end thereof, whereby said box will be pivotally moved about its upper forward end when it is pivoted to its dispensing position.

6. The vehicle of claim 3 wherein said first cover means has rearward and forward ends, said first cover means having a shaft operatively connected to its forward end which is rotatably secured to said box, said first and second cylinders being pivotally connected to the opposite ends of said shaft outwardly of the opposite sides of said first cover means and adapted to rotatably move said shaft to cause said first cover means to be pivotally moved with respect to said box.

7. The vehicle of claim 5 wherein said first power means is a hydraulic cylinder means connected to said frame means and said box to cause said box to pivot upwardly and forwardly with respect to said frame means from its collection position to its dispensing position.

*8. A refuse collecting and dispensing vehicle comprising:*

*a powered wheel frame means having first and second ends;*

*an operator's cab on said frame means at the first end thereof;*

*a refuse collection box having opposite ends and pivotally connected at one end to said frame means at the second end thereof, the other of said ends of said box being positioned adjacent said cab, said box having an open upper end;*

*a first power means connected to said box and adapted to pivotally move said box from a collection to a dispensing position;*

*said box having a first cover means pivotally mounted on its upper end adapted to pivotally move from an open position into said box about a horizontal axis to pack refuse in said box, said first cover means being positioned adajacent said other end of said box;*

*a second power means connected to said first cover means adapted to pivotally move said first cover means;*

*a normally closed second cover means pivotally mounted on the upper end of said box between said first cover means and said one end of said box and being adapted to be open when said box is pivoted to its dispensing position to permit the refuse in said box to be dumped therefrom through the open upper end thereof; and*

*said first and second cover means adapted to selectively close the open upper end of said box.*

*9. The vehicle of claim 8 wherein said powered wheeled frame means includes a pair of drive wheels at the second end thereof and a steering wheel means adjacent the first end thereof, said vehicle including a power means for driving said drive wheels, said power means being positioned between said drive wheels.*

*10. The vehicle of claim 8 wherein said second power means comprises first and second hydraulically operated cylinders positioned outwardly of the opposite sides of said box respectively.*

*11. The vehicle of claim 8 wherein said box has a first end wall adjacent said cab, a second end wall adjacent said second end of said frame means, opposite side walls, and a bottom; said second end wall being inclined and extending upwardly from said bottom wall and away from said cab, said box being adapted to receive refuse through said open upper end thereof adjacent said cab when said first cover means is in its open position, said first cover means being adapted to move the refuse placed in said box upwardly and toward said second end wall; said second cover means extending upwardly and away from said cab to permit refuse to be tumbled in said box by said first cover means.*

*12. The device of claim 8 wherein said box is pivotally connected to said second end of said frame means for pivotal movement about a horizontal axis adjacent said upper end of said inclined second end wall, whereby said box will be pivoted about said horizontal axis when it is pivoted to its dispensing position.*

*13. The vehicle of claim 10 wherein said first cover means has a shaft operatively connected thereto and rotatably secured to said box, said first and second cylinders being pivotally connected to the opposite ends of said shaft outwardly of the opposite sides of said first cover means and adapted to rotatably move said shaft to cause said first cover means to be pivotally moved with respect to said box.*

*14. The vehicle of claim 12 wherein said first power means is a hydraulic cylinder means connected to said frame means and said box to cause said box to pivot upwardly and away from said cab with respect to said frame means from its collection position to its dispensing position.*

References Cited

The following references, cited by the Examiner, are of record in the patented file of this patent or the original patent.

UNITED STATES PATENTS

| | | | |
|---|---|---|---|
| 2,826,318 | 3/1958 | Beasley | 214—302 X |
| 3,247,990 | 4/1966 | Prescott | 214—508 |

ALBERT J. MAKAY, Primary Examiner